3,201,313
Patented Aug. 17, 1965

3,201,313
INHIBITION OF CELLULAR REPRODUCTION
Thomas J. Bardos, Chicago, and Zinon B. Papanastassiou, Oak Lawn, Ill., assignors, by mesne assignments, to Armour Pharmaceutical Company, a corporation of Delaware
No Drawing. Filed Aug. 13, 1959, Ser. No. 833,397
20 Claims. (Cl. 167—78)

This invention relates to the inhibition of cellular reproduction, and more particularly to the retardation or prevention of neoplastic growth.

This patent application is in part a continuation of our co-pending patent application Serial No. 729,501, filed April 21, 1958, now abandoned.

In accordance with the method of this invention, there is contacted with living mitotic cells at least one compound having the formula

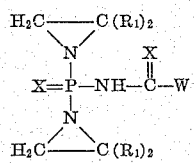

wherein X represents oxygen or sulfur, wherein $R_1$ represents hydrogen or an alkyl radical containing less than 5 carbon atoms, and wherein W represents a heterocyclic amino radical or the radicals —$OR_2$, —$N(R_2)_2$ or —$SR_2$ in which $R_2$ represents hydrogen, an alkyl radical containing less than 16 carbon atoms, a hydroxyalkyl radical containing less than 7 carbon atoms, an alicyclic radical containing less than 8 carbon atoms or phenyl or substituted phenyl or a heterocyclic amine radical.

In the method of this invention, better results may be obtained by contacting living mitotic cells with at least one compound having the formula

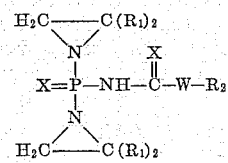

wherein X represents oxygen or sulfur, wherein $R_1$ represents hydrogen or an alkyl radical containing less than 5 carbon atoms, wherein W represents —O—, —NH— or —S—, and wherein $R_2$ represents hydrogen, an alkyl radical containing less than 5 carbon atoms, an hydroxyalkyl radical cointaining 5 or 6 carbon atoms, an alicyclic radical containing from 5 to 7 carbon atoms, phenyl or a heterocyclic amino radical.

It will be seen from the foregoing that the compounds which we have found to be useful in inhibiting the reproduction of living mitotic cells by inhibiting the biosynthesis of DNA are phosphoryl or thiophosphoryl carbamates containing two aziridinyl or alkyl-substituted aziridinyl groups and either a carbamate, thiocarbamyl, thioureido or ureido radical. Furthermore, it will be seen that the compounds employed in this method may be derivatives of either phosphoric or thiophosphoric acid.

An especially desirable class of compounds which may be employed in the method of this invention are illustrated by the formulae

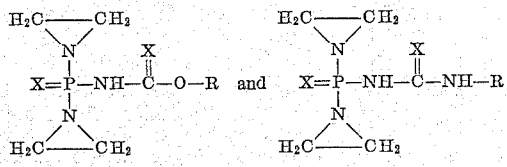

wherein X represents oxygen or sulfur and wherein R represents hydrogen, an alkyl radical containing less than 3 carbon atoms, i.e. a methyl or ethyl radical, ribose or glucose, an alicyclic radical containing from 5 to 7 carbon atoms or phenyl.

Thus, in the compounds which may be employed in the method of this invention described in the foregoing formulae, $R_1$ represents hydrogen or any alkyl radical containing less than 5 carbon atoms, better results are obtained with compounds in which $R_1$ is hydrogen or an alkyl radical containing less than 3 carbon atoms, i.e. a methyl or ethyl radical, and as denoted in the immediately preceding formulae, especially desirable are those compounds in which $R_1$ represents hydrogen. Furthermore, the oxygen or sulfur atom represented by X in the foregoing formulae are interchangeable, but for the purposes of this invention especially desirable results are obtained when such X represents an oxygen atom. Also, although it will be apparent that the heterocyclic amine radical represented in the foregoing formulae by $R_2$ may be derived from any heterocyclic amine such as piperidine, morpholine, pyrimidine, pyridine, uracil, thiouracil, thymine, pyrrolidine, piperazine and cytosine, better results are achieved when such $R_2$ is a heterocyclic amino radical. Still better in the process of this invention are those compounds in which $R_2$ represent a heterocyclic amine radical derived from a pyrimidine ring, and especially desirable are those compounds in which $R_2$ is derived from pyrimidine.

The compounds employed in the method of this invention can be obtained by subjecting to pyrolysis a bis-(ethylenimido) or bis-(alkylethylenimido)-phosphoryl or thiophosphoryl carbamate to obtain the corresponding isocyanate. The reaction of this isocyanate by addition with an alcohol, an amine or a mercaptan results in the formation of the corresponding carbamyl, thiocarbamyl, ureido or thioureido derivative. In the alternative, these compounds can be prepared by a method involving the reaction of phosphorus oxychloride or phosphorus thiochloride (1 mole) and ethylenimine or an alkyl-substituted ethylenimine (2 moles) in the presence of a hydrogen chloride acceptor (2 moles), e.g. triethylamine and an inert solvent, e.g. dimethoxyethane, to obtain the corresponding bis-(ethylenimido) or bis-(alkylethylenimido)-phosphoryl or thiophosphoryl chloride. This chloride is treated with potassium cyanate or thiocyanate to obtain the corresponding bis-(ethylenimido) or bis-(alkylethylenimido)-phosphoryl or thiophosphoryl isocyanate or isothiocyanate. Then, the isocyanate or isothiocyanate is reacted by addition with an alcohol, an amine or a mercaptan to obtain the corresponding carbamyl, thiocarbamyl, ureido or thioureido compound.

In the preferred practice of preparing these phosphoryl carbamates, equivalent amounts of phosphorus pentachloride and a carbamate or thiocarbamate compound are reacted in an inert solvent, e.g. ethylene chloride, to obtain the corresponding dichlorophosphoryl isocyanate or isothiocyanate, and then such isocyanate or isothiocyanate derivative is reacted with an equivalent amount of an alcohol, a thioalcohol or an amine to obtain the corresponding dichlorophosphoryl carbamyl, thiocarbamyl, ureido or thioureido compound, and finally the latter compound is reacted with ethylenimine or an alkyl-substituted ethylenimine or a metal salt thereof in the presence of a hydrogen chloride acceptor, e.g. a tertiary amine such as triethylamine, and an inert solvent, e.g. toluene, to obtain the corresponding phosphoryl carbamate.

It will be apparent that the compounds employed in the method of this invention contain radicals derived both from alkylating agents and compounds relating to urethane, and sometimes from the chemotherapeutic standpoint such compounds have been referred to as "dual antagonists," i.e. chemical compounds incorporating the structural features of two different antimetabolites into a single molecule. The toxicity of these compounds has been determined by the intravenous, subcutaneous and oral routes in various animals. In addition, there has been considerable evaluation of the effectiveness of these compounds in providing regression of various tumors in animals, especially sarcomas.

This invention can be further illustrated in the following specific examples:

*Example I*

The following method may be employed for preparing dichlorophosphoryl isocyanate:

A suspension of 0.25 mole of phosphorus pentachloride in 150 cc. of ethylene chloride is cooled to a temperature of 7° C., and there is added to the cooled suspension a solution of 0.25 mole of ethyl carbamate in 100 cc. of ethylene chloride. The resulting mixture is slowly heated to reflux temperature, the rate of heating depending upon the rate at which hydrogen chloride and ethyl chloride are liberated in the consequent reaction. When the evolution of gas in the reaction mixture has been completed, i.e. after about 4½ hours, the resulting solution is concentrated under vacuum, and the residue thereupon formed is fractionated under reduced pressure. The yield of dichlorophosphoryl isocyanate is about 70%, and the analysis of this compound is as follows:

Boiling point: 20–25° C. at 3 mm. of pressure or 37° C. at 8 mm. of pressure.
Spectrophotometric analysis: $N_D^{22}=1.466$.

*Example II*

Bis-(ethylenimido-phosphorylurethane can be prepared by the following method:

A solution of 0.315 mole of absolute ethanol in 400 cc. of dry toluene is added over a period of 2½ hours into a stirred solution of 0.315 mole of the dichlorophosphoryl isocyanate obtained according to the method of Example I in 400 cc. of dry toluene. The reaction mixture is maintained at a temperature of about −10° C. during this addition procedure, and thereafter such reaction mixture is warmed slowly to room temperature. The reaction mixture is stirred for an additional one-half hour, and is then concentrated under vacuum to ca. 400 cc.

The concentrated solution is added over a period of about 2½ hours to a cold solution of 0.63 mole of triethylamine and 0.63 mole of ethylenimine in 400 cc. of toluene. The temperature of the reaction mixture is maintained at about 0±5° C. during this addition procedure. The reaction mixture is stirred in the cold for an additional 15 minutes, and is then warmed to room temperature.

The solid formed is separated from the reaction mixture by filtration. This separated solid is washed with toluene, and is then triturated with three 300 ml. portions of dry benzene. After separating undissolved material by filtration, the benzene solution is concentrated to dryness under reduced pressure. The yield of bis-(ethylenimido)-phosphorylurethane is about 70%, and such product has a melting point of 88–90° C. An additional amount of the product may be obtained by evaporating the toluene solution to dryness, and then recrystallizing the resulting dry product from a benzene-petroleum ether mixture.

*Example III*

Methyl [bis-(ethylenimido)-phosphoryl] carbamate can be prepared by the following method:

A solution of 0.15 mole of absolute methanol in 200 ml. dry toluene is added over a period of 1½ hours to a stirred solution of 0.15 mole of the dichlorophosphoryl isocyanate obtained according to the method of Example I in 200 ml. dry toluene. The reaction mixture is maintained at a temperature of about −10° C. during this addition procedure, and thereafter such reaction mixture warmed slowly to room temperature. The reaction mixture is stirred for an additional ½ hour, and is then concentrated under vacuum to a volume of ca. 200 ml. The concentrated solution is added over a period of about 1½ hours to a cold solution of 0.3 mole of triethyl amine and 0.3 mole of ethylenimine in 220 cc. dry benzene. The temperature of the reaction mixture is maintained at about 0° C. during this addition procedure. The reaction mixture is stirred in the cold for an additional 15 minutes and is then warmed to room temperature.

The solid thereupon formed is separated from the reaction mixture by filtration and washed with dry benzene. The filtrate and washings are combined and evaporated to dryness under reduced pressure. The yield of methyl [bis-(ethylenimido)-phosphoryl] carbamate is about 76%, and such product has a melting point of 119–121° C.

*Example IV*

Benzyl[bis-(ethylenimido)-phosphoryl] carbamate can be prepared by the following method:

A mixture of 0.02 mole bis-(ethylenimido)-phosphorylurethane obtained according to the method of Example II in 75 ml. dry toluene, and 0.02 mole benzyl alcohol is boiled for 5 minutes. The reaction mixture is immediately cooled, and then a small quantity of white solid is separated therefrom by filtration. The resulting filtrate is concentrated to dryness under vacuum. The residue thereupon obtained is recrystallized from a benzene-cyclohexane mixture. The yield of benzyl[bis(ethylenimido)-phosphoryl] carbamate is about 55%, and such product has a melting point of 134–135° C.

*Example V*

Cyclohexyl[bis-(ethylenimido)-phosphoryl] carbamate can be prepared by the following method:

A mixture of 0.01 mole bis-(ethylenimido) phosphorylurethane obtained according to the method of Example II and 0.01 mole cyclohexanol in 50 ml. dry toluene is boiled for 5 minutes. The reaction mixture is immediately cooled in cold water and after separating a small quantity of a white solid by filtration, the filtrate is concentrated to dryness under reduced pressure. The residue cyclohexyl[bis-(ethylenimido)-phosphoryl] carbamate is recrystallized from benzene-petroleum ether mixture.

*Example VI*

5-glucosyl[bis - (ethylenimido)-phosphoryl] carbamate can be produced by the following method:

A mixture of 0.01 mole bis(ethylenimido)-phosphorylurethane, obtained according to the method of Example II, in 50 ml. dry toluene is boiled for 5 minutes. The reaction mixture is immediately cooled, and after separating from the cooled reaction mixture by filtration a small quantity of white solid, it is added slowly to a suspension of 0.01 mole glucose in 250 cc. dimethoxyethane with continuous stirring. A small quantity of unreacted glucose is separated by filtration, and the resulting filtrate is concentrated to dryness under reduced pressure. The resulting 5-glucosyl[bis-(ethylenimido)-phosphoryl] carbamate is recrystallized from a dimethoxyethane-ethyl ether mixture. All operations should be accomplished under very dry conditons.

*Example VII*

N-diethyl-N′-bis-(ethylenimido)-phosphoryl urea can be prepared by the following method:

A mixture of 0.02 mole bis-(ethylenimido)-phosphorylurethane, obtained according to the method of Example II, in 75 cc. dry toluene is boiled for 5 minutes. The reaction mixture is immediately cooled, and is then filtered to remove a small quantity of insoluble material. A solution of 0.015 mole diethylamine in 50 cc. dry toluene is then added slowly, and the small quantity of white precipitate thereupon formed is removed by filtration. The resulting filtrate is concentrated to dryness under reduced pressure. The dry N-diethyl-N'-bis-(ethylenimido)-phosphoryl urea is crystallized from a chloroform-acetone mixture. The yield of reaction product is about 30%, and such product decomposes on heating.

*Example VIII*

N-cyclohexyl - N'-bis(ethylenimido) - phosphoryl urea can be prepared by the following method:

A mixture of 0.01 mole bis-(ethylenimido)-phosphorylurethane, obtained according to the method of Example II, in 75 ml. dry toluene is boiled for 5 minutes. The reaction mixture is immediately cooled in cold water, and a small quantity of insoluble material is separated therefrom by filtration. A solution of 0.0075 mole cyclohexylamine in 75 ml. dry toluene is then slowly added to the resulting filtrate which is then concentrated to dryness under reduced pressure. The residual white solid is recrystallized from a chloroform-cyclohexane mixture. The yield of N-cyclohexyl-N'-bis-(ethylenimido)-phosphoryl urea is about 30%, and such product melts with decomposition at 250–3° C.

*Example IX*

N-[bis-(ethylenimido)-phosphoryl]-N'-phenylurea can be prepared by the following method:

A solution of 0.059 mole of aniline in 60 ml. dry ethyl ether is added over a period of one hour to a stirred solution of 0.059 mole of the dichlorophosphoryl isocyanate obtained according to the method of Example I in 150 ml. of dry ether and 50 ml. of dry benzene. The reaction mixture is maintained at a temperature of about 0° C. during the addition procedure, and is thereafter warmed slowly to room temperature. The solid thereupon formed is separated by filtration.

The separated solid is suspended in 250 ml. dry benzene and added over a period of one hour to a solution of 0.08 mole of ethylenimine and 0.08 mole of triethylamine in 200 ml. dry benzene. The temperature of the reaction mixture is maintained at 0° C. during the addition procedure. The reaction mixture is stirred in the cold for an additional 15 minutes and is then warmed to room temperature. Thereafter the mixture is stirred for an additional 1½ hours. The solid thereupon formed is separated from the reaction mixture by filtration and washed with 5 x 200 ml. portions of warm benzene. Evaporation of the resulting filtrate and washings to dryness provides a yield of 20% of N-[bis-(ethylenimido)-phosphoryl]-N'-phenylurea. This product, after recrystallization from a chloroform-cyclohexane mixture, melts with decomposition at ca. 250° C.

*Example X*

Methyl[bis - (ethylenimido) - thiophosphoryl] - thionocarbamate can be prepared by the following method:

A solution of 0.063 mole thiophosphoryl chloride in 50 ml. dry dimethoxyethane was cooled to −10° C. and 0.126 mole triethylamine in 100 ml. dimethoxyethane was added slowly with stirring, the temperature varying between −5° C. and −20° C. A solution of 0.126 mole ethylenimine in 100 ml. dimethoxyethane was then added dropwise, under the same conditions. The reaction mixture was allowed to stand overnight under nitrogen, at room temperature. The resulting solution, after filtration and removal of triethylamine hydrochloride, was then treated with a solution of 0.036 mole potassium thiocyanate in 200 ml. dimethoxyethane at room temperature and under mechanical stirring. The addition procedure lasted for ca. 2½ hours and the mixture was then stirred overnight. The solid formed (potassium chloride) was removed by filtration, and the resulting filtrate was concentrated to dryness. It was then dissolved in 500 ml. dry acetone containing 0.05 mole absolute methyl alcohol and the mixture refluxed until the strong isothiocyanate infrared absorption peak disappeared (in about 3 to 4 hours refluxing time). The mixture is then filtered and the filtrate concentrated to dryness under reduced pressure and the residue recrystallized from methylene chloride.

*Example XI*

Bis - (2 - methylethylenimido) - phosphorylurethane can be prepared by the following method:

A solution of 0.15 mole of absolute ethanol in 180 cc. of dry toluene is added over a period of one hour to a stirred solution of 0.15 mole of the dichlorophosphoryl isocyanate obtained according to the method of Example I in 150 cc. of dry toluene. The reaction mixture is maintained at a temperature of about −10° C. during this addition procedure, and is thereafter warmed slowly to room temperature. The reaction mixture is stirred for an additional ½ hour, and is then concentrated under vacuum.

The resulting residue is dissolved in 150 cc. of toluene, and this solution is added over a period of about one hour to a cold solution of 0.3 mole of triethylamine and 0.3 mole of 2-methylethylenimine in 250 cc. of toluene. The temperature of the reaction mixture is maintained at about −10° C. during this addition procedure. The reaction mixture is stirred in the cold for an additional 15 minutes, and is then warmed to room temperature. Thereafter, the reaction mixture is stirred for an additional one and one-half hours.

Then, the triethylamine hydrochloride reaction product is separated by filtration, and the resulting filtrate is concentrated to dryness. The dry product is recrystallized from a benzene-petroleum ether mixture.

*Example XII*

Ethyl[bis - (ethylenimido)-phosphoryl]-thiolcarbamate can be prepared by the following method:

A solution of 0.15 mole of ethyl mercaptan in 180 cc. of dry toluene is added over a period of one hour into a stirred solution of 0.15 mole of the dichlorophosphoryl isocyanate obtained according to the method of Example I in 150 cc. of dry toluene. The reaction mixture is maintained at a temperature of about −10° C. during this addition procedure, and is thereafter warmed slowly to room temperature. The reaction mixture is stirred for an additional ½ hour, and is then concentrated under vacuum.

The resulting residue is dissolved in 150 cc. of toluene, and this solution is added over a period of about one hour to a cold solution of 0.3 mole of triethylamine and 0.3 mole of ethylenimine in 250 cc. of toluene. The temperature of the reaction mixture is maintained at about −10° C. during this addition procedure. The reaction mixture is stirred in the cold for an additional 15 minutes, and is then warmed to room temperature. Thereafter, the reaction mixture is stirred for an additional 1½ hours.

Then, the triethylamine hydrochloride reaction product is separated by filtration, and the resulting filtrate is concentrated to dryness. The dry product is recrystallized from a benzene-petroleum ether mixture.

*Example XIII*

N - [bis - (ethylenimido) - phosphoryl] - N' - phenyl-N'-ethylurea can be prepared by the following method:

A solution of 0.15 mole of phenylethylamine in 180 cc. of dry toluene is added over a period of one hour into a stirred solution of 0.15 mole of dichlorophosphoryl isocyanate obtained according to the method of Example I in 150 cc. of dry toluene. The reaction mixture is maintained at a temperature of about −10° C. during this addition procedure and is is thereafter warmed slowly to room temperature. The reaction mixture is stirred for an additional ½ hour, and the solid is then separated by filtration.

The resulting solid is suspended in 150 cc. of toluene, and this suspension is added in small portions over a period of about one hour to a cold solution of 0.3 mole of triethylamine and 0.3 mole of ethylenimine in 250 cc. of toluene. The temperature of the reaction mixture is maintained at about 0° C. during this addition procedure. Then, the reaction mixture is stirred in the cold for an additional 15 minutes, and is then warmed to room temperature. Thereafter, the reaction mixture is stirred for an additional 1½ hours.

Then, the triethylamine hydrochloride reaction product is separated by filtration, and the resulting filtrate is concentrated to dryness. The dry product is recrystallized from a chloroform-cyclohexane mixture.

*Example XIV*

5 - uracil[bis - (ethylenimido) - phosphoryl] - thiolcarbamate can be prepared by the following method:

A mixture of 0.01 mole bis-(ethylenimido)-phosphorylurethane obtained according to the method of Example II, in 100 ml. of dry toluene is boiled for 5 minutes. The reaction mixture is immediately cooled to about 5° C. and, after separating therefrom a small quantity of white solid, it is added slowly to a suspension of 0.01 mole of 5-mercaptouracil in 100 cc. of toluene. The resulting mixture is stirred overnight at room temperature. Then the solid is separated from the mixture by filtration and washed with toluene. This solid, 5-uracil[bis-(ethylenimido)-phosphoryl] thiolcarbamate, is recrystallized from a chloroform solution.

*Example XV*

N-(5-uracil)-N'-bis - (ethylenimido) - phosphoryl urea can be prepared by the following method:

A mixture of 0.01 mole bis-(ethylenimido)-phosphorylurethane obtained according to the method of Example II in 100 ml. of dry toluene is boiled for 5 minutes. The reaction mixture is immediately cooled to about 5° C. and, after separating therefrom a small quantity of white solid, it is added slowly to a suspension of 0.01 mole of 5-aminouracil in 100 cc. of toluene. The resulting mixture is stirred overnight at room temperature. Then the solid is separated from the mixture by filtration and recrystallized separately from chloroform to obtain N-(5-uracil)-N'-bis-(ethylenimido)-phosphoryl urea.

*Example XVI*

Bis-(ethylenimido)-thiophosphorylurethane can be prepared by the following method:

A solution of 0.05 mole thiophosphoryl chloride in 100 ml. dry dimethoxyethane is cooled to −10° C., and 0.1 mole triethylamine in 100 ml. dimethoxyethane is added slowly with stirring, while maintaining the temperature thereof at about −10° C. A solution of 0.1 mole ethylenimine in 50 ml. of dry dimethoxyethane is then added dropwise under the same conditions. The reaction mixture is allowed to stand overnight at room temperature. Then the mixture is filtered to remove the triethylamine hydrochloride. The resulting filtrate is then heated with a suspension of 0.03 mole potassium cyanate in 100 ml. dimethoxyethane. The mixture thereupon formed is stirred under dry nitrogen gas at room temperature for 24 hours. The precipitate, consisting of potassium chloride and unreacted potassium cyanate, is separated from the mixture by filtration and the resulting filtrate is cooled to about 0° C. Then a solution of 0.03 mole of absolute ethyl alcohol is added to the cooled filtrate while undergoing continuous stirring. The temperature during the addition procedure is maintained at about 0° C. After the addition has been completed the solution is warmed to room temperature and stirred for an additional 2 hours. It is then concentrated to dryness under reduced pressure. The residue bis-(ethylenimido)-thiophosphorylurethane, is recrystallized from a benzene-cyclohexane mixture.

*Example XVII*

5-ribosyl[bis - (ethylenimido - thiophosphoryl] carbamate can be prepared by the following method:

A solution of 0.05 mole of thiophosphoryl chloride in 100 ml. of dry dimethoxyethane is cooled to −10° C., and 0.1 mole triethylamine in 100 ml. dry dimethoxyethane is added slowly with stirring; the temperature of the mixture being maintained at about −10° C. A solution of 0.1 mole of ethylenimine in 100 ml. of dry dimethoxyethane is then added dropwise under similar conditions. The reaction mixture is stirred at room temperature overnight. The solid thereupon formed is separated from the mixture by filtration. The resulting filtrate is treated with a suspension of 0.03 mole potassium cyanate in 100 ml. of dry dimethoxyethane. The mixture thereupon formed is stirred at room temperature under dry nitrogen gas for 24 hours. The precipitate, potassium chloride and unreacted potassium cyanate, is separated from the mixture by filtration. To the resulting filtrate is added a solution of 0.02 mole of D-ribose in 300 ml. of dry dimethoxyethane over a period of about ½ hour, with continuous agitation. The temperature during the addition procedure is maintained at about 0° C. The mixture is then warmed to room temperature and stirred for an additional 3 hours. After removing from the mixture by filtration a small quantity of insoluble material, the resulting filtrate is concentrated to dryness. The residue, 5-ribosyl[bis - (ethylenimido) - thiophosphoryl] carbamate, is recrystallized from a dimethoxyethane-ethyl ether mixture.

*Example XVIII*

Benzyl [bis-(ethylenimido)-phosphoryl] thiocarbamate can be prepared by the following method:

A solution of 0.05 mole of phosphorus oxychloride in 50 ml. of dry dimethoxyethane is cooled to −10° C., and there is added a solution of 0.1 mole of triethylamine in 100 ml. of dry dimethoxyethane, with stirring and while maintaining the temperature thereof at about −10° C. Then, a solution of 0.1 mole of ethylenimine in 100 ml. of dimethoxyethane is added under similar conditions. The reaction mixture is allowed to stand overnight at room temperature. The solid thereupon formed is separated from the mixture by filtration. To the resulting filtrate is added a solution of 0.03 mole of potassium thiocyanate in 200 ml. of dry dimethoxyethane at room temperature, with stirring. The mixture is stirred overnight and the solid thereupon formed is separated from the mixture by filtration. To the resulting filtrate is added a solution of 0.03 mole of benzyl alcohol in 100 ml. of dimethoxyethane. The temperature during the addition is maintained at 0° C., and the solution is continuously stirred. After the addition has been completed, the mixture is stirred for an additional 4 hours at room temperature. Then the mixture is concentrated under reduced pressure. The residue, benzyl [bis-(ethylenimido)-phosphoryl] thiocarbamate, is recrystallized from a chloroform-cyclohexane mixture.

Instead of the benzyl alcohol employed in the method of Example IV, there may be substituted furfuryl alcohol to obtain the corresponding furfuryl [bis-(ethylimido)-phosphoryl] carbamate.

*Example XIX*

The following compounds of this invention were subjected to acute toxicity determinations in laboratory animals:

(A) Bis-(ethylenimido)-phosphorylurethane.
(B) Methyl-bis(ethylenimido)-phosphorylcarbamate.
(C) Benzyl-[bis-(ethylenimido)-phosphoryl]carbamate.

The results obtained in acute intravenous toxicity in ICR/Ha Swiss mice were, in terms of $LD_{50}$ values (mg./kg.), as follows:

(A) 69.4
(B) 62.3
(C) 80.0

The corresponding $LD_{50}$ values for these compounds, after intraperitoneal and subcutaneous administration, were the same or only slightly higher than those for the acute intravenous toxicity, which indicated rapid absorption of the compounds.

Example XX

The compounds of Example XIX were subjected to evaluation in producing regression of mouse and rat neoplasms.

In these comparisons, 11 mouse and rat neoplasms were employed, and the compounds of this invention were compared directly with nitrogen mustard under a variety of experimental conditions. In doses of equal toxicity, compounds A, B and C above, were superior or equal to nitrogen mustard in producing regression of these mouse and rat neoplasms.

Compounds A, B and C above were all active in the "standard" sarcoma 180 test in mice. The average $T/C$ ratios thereof were 32% by tumor diameter measurement and 3–4% (0.03–0.04) by tumor weight.

Also, in evaluating compounds A, B and C in connection with sarcoma 180, ICR/Ha Swiss mice were inoculated subcutaneously and intraperitoneally with known numbers of ascites tumor cells. In these situations, compounds A, B and C provided significant inhibition of tumor growth by subcutaneous administration and of ascites formation by intraperitoneal administration. Further, compounds A and C were highly effective against Ehrlich ascites tumor and adenocarcinoma 755.

Also, in a number of transplanted leukemias, significant prolongation of life was obtained with compounds A and C. In addition, in DBA/2 mice inoculated with leukemia L1210, four animals out of 50 subjected to treatment with compound C survived 90 days after inoculation, and such surviving animals showed no sign of disease when sacrificed and autopsied at this time.

In C3H mice with "spontaneous" mammary tumors, toxic doses of compound C, which killed all of the animals within two weeks, produced regression of existing tumors, while non-toxic doses significantly inhibited tumor growth.

In rats, compounds A, B and C completely inhibited the growth of Walker carcinosarcoma 256 tumors at well-tolerated dosage levels. In Dunning rat leukemia, compounds A, B and C, administered only during the first twelve days after implantation of the tumors, produced complete inhibition of tumor growth and apparently cured all of the animals.

When such animals were reinoculated with the tumor after 42 days, all of the animals developed tumors and died of leukemia. On the other hand, in the control animals, tumors appeared on the 8th day after implantation, and all of the animals died of leukemia on the 18th–19th day. Even when the treatment was delayed until the 16th day after tumor implantation, when the average tumor size had to reach 3.5 cm. and the white cell count was about 70–90,000, compounds A and C still produced regression of all visible tumors. However, in this instance, the tumors reappeared after the treatment was discontinued, and thereafter all of the animals died.

While in the foregoing specification there has been set forth specific embodiments of this invention for the purpose of illustration, it will be apparent to those skilled in the art that this invention is susceptible to other embodiments and that many of these details can be varied widely without departing from the basic concept and spirit of this invention.

We claim:

1. In a method of inhibiting the reproduction of living mitotic cells, the contacting of living mitotic cells with a compound of the formula

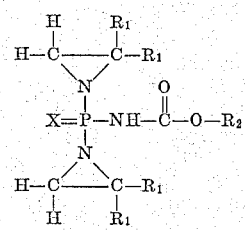

wherein:

X is selected from the group consisting of oxygen and sulfur;

$R_1$ is selected from the group consisting of hydrogen and alkyl of 1 to 4 carbon atoms; and $R_2$ is selected from the group consisting of alkyl of 1 to 4 carbon atoms, and benzyl.

2. In a method of inhibiting the reproduction of living mitotic cells, the contacting of living mitotic cells with ethyl N-[bis(ethylenimido)phosphoro] carbamate.

3. In a method of inhibiting the reproduction of living mitotic cells, the contacting of living mitotic cells with methyl-bis(ethylenimido)phosphorylcarbamate.

4. In a method of inhibiting the reproduction of living mitotic cells, the contacting of living mitotic cells with benzyl-bis(ethylenimido)phosphorylcarbamate.

5. In a method of inhibiting the reproduction of living mitotic cells, the contacting of living mitotic cells with methyl-bis(ethylenimido)thiophosphorylcarbamate.

6. In a method of inhibiting the reproduction of living mitotic cells, the contacting of living mitotic cells with ethyl N-[bis-(2,2-dimethylethylenimido)phosphoro] carbamate.

7. A compound of the formula

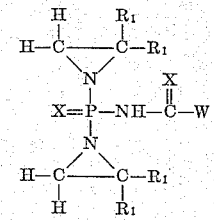

wherein:

X is selected from the group consisting of oxygen and sulfur;

R is selected from the group consisting of hydrogen and alkyl of 1 to 4 carbon atoms;

W is selected from the group consisting of —$OR_2$, —$SR_2$ and —$N(R_2)_2$ in which:

$R_2$ is selected from the group consisting of hydrogen, alkyl of 1 to 15 carbon atoms and benzyl.

8. Ethyl N-[bis(ethylenimido)phosphoro] carbamate.

9. Ethyl N-[bis(2,2-dimethylethylenimido)phosphoro] carbamate.

10. Methyl N - [bis(ethylenimido)phosphoro] carbamate.

11. Benzyl N - [bis(ethylenimido)phosphoro] carbamate.

12. Methyl N-[bis(ethylenimido)thiophosphoro] carbamate.

13. A compound of the formula

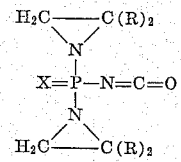

wherein X is selected from the group consisting of oxygen and sulfur, and R is selected from the group consisting of hydrogen and alkyl of 1 to 4 carbon atoms.

14. Bis(ethylenimido)phosphoryl isocyanate.
15. Bis-(ethylenimido)thiophosphoryl isocyanate.
16. Bis-(2-methylenimido)phosphoryl isocyanate.
17. In a method of preparing a compound selected from the group consisting of bis-(ethylenimido) and bis-(alkylethylenimido)phosphoryl isocyanate, the steps of reacting phosphorus oxychloride and at least two moles of a compound selected from the group consisting of ethylenimine and alkylethylenimine per mole of said phosphorus oxychloride in the presence of at least two moles of a hydrogen chloride acceptor per mole of said phosphorus oxychloride to obtain the corresponding compound selected from the group consisting of bis-(ethylenimido) and bis-(alkylethylenimido) phosphoryl chloride, and reacting the chloride compound with potassium cyanate to obtain the corresponding compound selected from the group consisting of bis-(ethylenimido) and bis-(alkylethylenimido) phosphoryl isocyanate, said alkyl containing from 1 to 4 carbon atoms.

18. In a method of preparing a compound selected from the group consisting of bis-(ethylenimido) and bis-(alkylethylenimido) phosphoryl isothiocyanate, the steps of reacting phosphorus oxychloride with at least two moles of a compound selected from the group consisting of ethylenimine and alkylethylenimine per mole of said phosphorus oxychloride in the presence of at least two moles of a hydrogen chloride acceptor to obtain the corresponding compound selected from the group consisting of bis-(ethylenimido) and bis-(alkylethylenimido)phosphoryl chloride and reacting the chloride compound with potassium thiocyanate to obtain the corresponding compound selected from the group consisting of bis-(ethylenimido) and bis-(alkylethylenimido) phosphoryl isothiocyanate, said alkyl containing less than 5 carbon atoms.

19. In a method of preparing a compound selected from the group consisting of ethylenimido and bis-(ethylenimido)thiophosphoryl isocyanate, the steps of reacting phosphorus thiochloride and at least two moles of a compound selected from the group consisting of ethylenimine and alkylethylenimine per mole of said phosphorus thiochloride in the presence of at least two moles of hydrogen chloride acceptor per mole of said phosphorus thiochloride to obtain the corresponding compound selected from the group consisting of bis-(ethylenimido) and bis-(alkylethylenimido) thiophosphoryl chloride, and reacting the chloride compound with potassium cyanate to obtain the corresponding compound selected from the group consisting of bis-(ethylenimido) and bis-(alkylethylenimido)thiophosphoryl isocyanate, said alkyl containing less than 5 carbon atoms.

20. In a method of preparing a compound selected from the group consisting of bis-(ethylenimido) and bis-(alkylethylenimido) thiophosphoryl isothiocyanate, the steps of reacting phosphorus thiochloride and at least two moles of a compound selected from the group consisting of ethylenimine and alkylethylenimine per mole of said phosphorus thiochloride in the presence of at least two moles of hydrogen chloride acceptor per mole of said phosphorus thiochloride to obtain the corresponding compound selected from the group consisting of bis-(ethylenimido) and bis-(alkylethylenimido) thiophosphoryl chloride, and reacting the chloride compound with potassium thiocyanate to obtain the corresponding compound selected from the group consisting of bis-(ethylenimido) and bis-(alkylethylenimido) thiophosphoryl isothiocyanate, said alkyl containing less than 5 carbon atoms.

References Cited by the Examiner

Bardos et al.: Nature, vol. 183, No. 4658 (1959), pp. 399–400.

Gaus et al.: Angewandte Chemie, vol. 67, No. 8, 1955, pp. 226–231.

NICHOLAS S. RIZZO, *Primary Examiner.*

MORRIS O. WOLK, IRVING MARCUS, *Examiners.*

UNITED STATES PATENT OFFICE
CERTIFICATE OF CORRECTION

Patent No. 3,201,313                      August 17, 1965

Thomas J. Bardos et al.

It is hereby certified that error appears in the above numbered patent requiring correction and that the said Letters Patent should read as corrected below.

Column 6, line 69, strike out "is", second occurrence; column 11, line 3, for "-methylenimido" read -- -methylethylenimido --.

Signed and sealed this 12th day of April 1966.

(SEAL)
Attest:

ERNEST W. SWIDER                               EDWARD J. BRENNER
Attesting Officer                                      Commissioner of Patents